(12) United States Patent
Lu et al.

(10) Patent No.: US 11,198,112 B2
(45) Date of Patent: Dec. 14, 2021

(54) DINUCLEAR RHODIUM COMPLEX-DOPED PLATINUM/HOLLOW MESOPOROUS SILICA SPHERE COMPOSITE MATERIAL, AND PREPARATION METHOD AND APPLICATION THEREOF

(71) Applicant: SOOCHOW UNIVERSITY, Suzhou (CN)

(72) Inventors: Jianmei Lu, Suzhou (CN); Dongyun Chen, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 350 days.

(21) Appl. No.: 16/509,335

(22) Filed: Jul. 11, 2019

(65) Prior Publication Data
US 2020/0016575 A1 Jan. 16, 2020

(30) Foreign Application Priority Data
Jul. 12, 2018 (CN) .......................... 201810765792.X

(51) Int. Cl.
*B01J 23/46* (2006.01)
*B01D 53/86* (2006.01)
(Continued)

(52) U.S. Cl.
CPC .......... *B01J 23/464* (2013.01); *B01D 53/864* (2013.01); *B01J 21/08* (2013.01); *B01J 35/008* (2013.01);
(Continued)

(58) Field of Classification Search
CPC . B01J 21/08; B01J 23/40; B01J 35/008; B01J 35/08; B01J 37/0072; B01J 37/16; B01D 53/864; B01D 2255/1021
See application file for complete search history.

(56) References Cited

PUBLICATIONS

Chen et al., Hollow/Rattle-type mesoporous nanostructures by a structural difference-based selective etching strategy, ACS Nano, 2010, 4, 1, 529-539 (Year: 2010).*
(Continued)

*Primary Examiner* — Coris Fung
*Assistant Examiner* — Keling Zhang
(74) *Attorney, Agent, or Firm* — SZDC Law P.C.

(57) ABSTRACT

The invention discloses a dinuclear rhodium complex-doped platinum/hollow mesoporous silica sphere composite material, and a preparation method and an application thereof. The preparation method comprises the following steps: preparing hollow mesoporous silica by a selective etching technology, uniformly distributed a precious metal platinum in the channels of the hollow mesoporous silica by using simple impregnation, and mixing the obtained catalyst with dinuclear rhodium complex adsorbed silica gel to obtain the composite material integrating a chromogenic probe with the catalyst. The preparation method is simple, and the chromogenic performance of the dinuclear rhodium complex material and catalysis performance of the catalyst can achieve simultaneous detection and catalyst of CO; and the dinuclear rhodium complex has obvious response to CO, and has chromogenic change in the presence of 50 ppm CO, and the product prepared through the preparation method has excellent CO detection and treatment properties, and highly facilitates industrial application.

2 Claims, 4 Drawing Sheets

(51) Int. Cl.
*B01J 21/08* (2006.01)
*B01J 35/00* (2006.01)
*B01J 37/02* (2006.01)
*B01J 37/10* (2006.01)
*B01J 37/16* (2006.01)

(52) U.S. Cl.
CPC ....... *B01J 35/0013* (2013.01); *B01J 37/0205* (2013.01); *B01J 37/10* (2013.01); *B01J 37/16* (2013.01); *B01D 2255/1021* (2013.01); *B01D 2255/1025* (2013.01)

(56) References Cited

PUBLICATIONS

Fukuoka et al., Preferential oxidation of carbon monoxide catalyzed by platinum nanoparticles in mesoporous silica, Journal of the American Chemical Society 2007 129 (33), 10120-10125 (Year: 2007).*

Redondo et al., Synthesis of sub-nanometer gold particles on modified silica, Dalton Trans., 2016, 45, 2983-2988 (Year: 2016).*

G. Büchel et al., A novel pathway for synthesis of submicrometer-size solid core/mesoporous shell silica spheres, Adv. Mater., 1998, 10, 13 (Year: 1998).*

F. Cuoq et al., Preparation of amino-functionalized silica in aqueous conditions, Applied Surface Science, 2013, 266, 155-160 (Year: 2013).*

Moragues et al., Sensitive and Selective Chromogenic Sensing of Carbon Monoxide via Reversible Axial CO Coordination in Binuclear Rhodium Complexes, J. Am. Chem. Soc. 2011, 133, 15762-15772 (Year: 2011).*

Chakravarty et al., Structural and electrochemical characterization of the novel ortho-metalated dirhodium (II) compounds Rh2(O2CCH3)2[(C6H5)2P(C6H4)]2·2L, Organometallics, 1985, 4, 8-13 (Year: 1985).*

Durães et al., Effect of the drying conditions on the microstructure of silica based xerogels and aerogels, J. of Nanoscience and Nanotechnology, 2012, 12, 6828-6834 (Year: 2012).*

* cited by examiner

DINUCLEAR RHODIUM COMPLEX-DOPED PLATINUM/HOLLOW MESOPOROUS SILICA SPHERE COMPOSITE MATERIAL, AND PREPARATION METHOD AND APPLICATION THEREOF

This application claims priority to Chinese Patent Application No.: 201810765792.X, filed on Jul. 12, 2018, which is incorporated by reference for all purposes as if fully set forth herein.

FIELD OF THE INVENTION

The present invention relates to the technical field of nano composite materials, in particular to a preparation method of a dinuclear rhodium complex-doped platinum/hollow mesoporous silica sphere composite material and its application in detection and treatment of CO waste gas.

TECHNICAL BACKGROUND

In recent years, with the rapid development of technology and rapid industrialization, the emission of toxic gases such as CO, $SO_2$ and $NO_2$ is seriously exceeded the standard, which has damaged the ecological environment and endangered human health. CO is one of the most common and most harmful toxic gases, the emissions of CO gas mainly come from automobile exhaust and the insufficient combustion of coal. It is colorless and odorless, and can quickly combine with hemoglobin in the human body to crowd out oxygen, resulting in human hypoxia. The harm to the human body is very serious. Therefore, the treatment of CO gas pollution is imminent, and the catalytic oxidation of CO with metal nanoparticles is a promising and widely used gas treatment method.

The existing CO sensors include solid-state sensors, thermocouples, etc., but there are large limits in detection. To date, there has been almost no report on the integration of detection and catalysis for waste gas treatment, especially CO treatment.

SUMMARY OF THE INVENTION

The object of the present invention is to provide a preparation method of a dinuclear rhodium complex-doped platinum/hollow mesoporous silica sphere composite material, and using a simple selective etching and impregnation method to load uniform platinum nanoparticles into the pores of the hollow mesoporous silica. The detection and catalytic materials are mixed together by simple physical mixing to achieve the purpose of simultaneously detection and treatment of the CO gas discharged in the air.

In order to achieve the above object, the technical solution of the present invention is described as follows:

A preparation method of a dinuclear rhodium complex-doped platinum/hollow mesoporous silica sphere composite material, characterized in comprising the following steps:

(1) mixing ethanol, water, ammonia water and tetraethyl orthosilicate to obtain silica nanospheres; then adding tetraethyl orthosilicate and octadecyltrimethoxysilane to obtain core-shell structure silica spheres;

(2) adding core-shell structure silica spheres to a sodium carbonate solution for reaction, and then calcining to obtain hollow mesoporous silica spheres;

(3) after surface amination, immersing the hollow mesoporous silica spheres in a solution containing chloroplatinic acid, stirring and centrifuging, and then reduced to obtain platinum/hollow mesoporous silica spheres;

(4) mixing triphenylphosphine, rhodium acetate dimer, and acetic acid under an argon atmosphere to obtain a dinuclear rhodium complex;

(5) dispersing the platinum/hollow mesoporous silica spheres and dinuclear rhodium complex in ethanol containing silica gel to obtain a dinuclear rhodium complex-doped platinum/hollow mesoporous silica sphere composite material.

A method of detection and/or treating CO, characterized in comprising the following steps:

(1) mixing ethanol, water, ammonia water and tetraethyl orthosilicate to obtain silica nanospheres; then adding tetraethyl orthosilicate and octadecyltrimethoxysilane to obtain core-shell structure silica spheres;

(2) adding core-shell structure silica spheres to a sodium carbonate solution for reaction, and then calcining to obtain hollow mesoporous silica spheres;

(3) after surface amination, immersing the hollow mesoporous silica spheres in a solution containing chloroplatinic acid, stirring and centrifuging, and then reduced to obtain platinum/hollow mesoporous silica spheres;

(4) mixing triphenylphosphine, rhodium acetate dimer, and acetic acid under an argon atmosphere to obtain a dinuclear rhodium complex;

(5) dispersing the platinum/hollow mesoporous silica spheres and dinuclear rhodium complex in ethanol containing silica gel to obtain a dinuclear rhodium complex-doped platinum/hollow mesoporous silica sphere composite material;

(6) placing the platinum/hollow mesoporous silica spheres or the dinuclear rhodium complex-doped platinum/hollow mesoporous silica sphere composite material in an environment containing CO to complete detection and/or treatment of CO.

A preparation method of platinum/hollow mesoporous silica spheres, characterized in comprising the following steps:

(1) mixing ethanol, water, ammonia water and tetraethyl orthosilicate to obtain silica nanospheres; then adding tetraethyl orthosilicate and octadecyltrimethoxysilane to obtain core-shell structure silica spheres;

(2) adding core-shell structure silica spheres to a sodium carbonate solution for reaction, and then calcining to obtain hollow mesoporous silica spheres;

(3) after surface amination, immersing the hollow mesoporous silica spheres in a solution containing chloroplatinic acid, stirring and centrifuging, and then reduced to obtain platinum/hollow mesoporous silica spheres.

In above technical solution, in the step (1), the mass ratio of ethanol, water, ammonia water, tetraethyl orthosilicate is (580~590):(90~110):(0~32):(50~55), preferably 585:100:31:52; first, the ethanol, water and ammonia water are mixed and stirred at room temperature for 20 to 30 minutes, then tetraethyl orthosilicate is added, stirred for 5 to 10 minutes, and then allowed to stand for 60 to 90 minutes to obtain silica nanospheres; then tetraethyl silicate and octadecyltrimethoxysilane are added, and stand at room temperature for 2 to 4 hours to obtain core-shell silica spheres.

In above technical solution, in the step (2), the concentration of the sodium carbonate solution is 0.5 to 0.7 mol/L; the reaction temperature is 70 to 90° C., the time is 1 to 2 hours; during calcination, the heating rate is 2 to 10° C./min, the time is 5 to 10 h, and the temperature is 500 to 600° C.

In above technical solution, in the step (3), the surface amination reagent is 3-aminopropyltriethoxysilane, the solvent is ethanol; and the surface amination temperature is 100° C.~130° C., time is 24~36 hours; the mass ratio of 3-aminopropyl triethoxysilane, ethanol and hollow mesoporous silica sphere is (10~20):(190~210):(2~5), preferably 10:(190~210):2; stirring treatment is carried out under vacuum for 5 to 10 hours; in the reducing process, the heating rate is 2 to 5° C./min, the time is 2 to 4 hours, the temperature is 200 to 300° C.; in the solution containing chloroplatinic acid, the solvent is water, the concentration is 20 mmol/L; when reducing, the reducing agent is hydrogen.

In above technical solution, in the step (4), the mass ratio of triphenylphosphine, rhodium acetate dimer, and acetic acid is (1~2):(1~2):(100~150), preferably 1:1:100, the temperature is 120° C.~150° C., the time is 30 to 60 minutes.

In above technical solution, in the step (5), the mass ratio of platinum/hollow mesoporous silica spheres, dinuclear rhodium complex, ethanol and silica gel is (1~2):(2~5):(50~60):(20~40), preferably 1:2:50:20.

A dinuclear rhodium complex-doped platinum/hollow mesoporous silica sphere composite material prepared by above preparation method of a dinuclear rhodium complex-doped platinum/hollow mesoporous silica sphere composite material; or platinum/hollow mesoporous silica spheres prepared by above preparation method of platinum/hollow mesoporous silica spheres.

The application of the dinuclear rhodium complex-doped platinum/hollow mesoporous silica sphere composite material or the platinum/hollow mesoporous silica spheres in the detection and treatment of CO.

The application of the platinum/hollow mesoporous silica spheres in the preparation of the dinuclear rhodium complex-doped platinum/hollow mesoporous silica sphere composite material.

In the invention, the preparation steps of the dinuclear rhodium complex-doped platinum/hollow mesoporous silica sphere composite material can be described as below:

(1) Ethanol, water, ammonia solution, tetraethyl orthosilicate (TEOs) are mixed to obtain uniform silica nanospheres, and then TEOs and octadecyltrimethoxysilane (C18TMOs) are added to obtain core-shell silica spheres ($sSiO_2@mSiO_2$); the $sSiO_2@mSiO_2$ is selectively etched with a sodium carbonate solution, dried in an oven at 80° C., and calcined in air to obtain hollow mesoporous silicon spheres (HMSs).

(2) Surface amination of HMSs to obtain hollow mesoporous silica spheres with amino groups on the surface, immersing them in the chloroplatinic acid solution with stirring, and then the product is collected by centrifugation, and then the platinum are uniform loaded in the pores of HMSs using hydrogen as a reducing agent.

(3) Mixing triphenylphosphine, rhodium acetate dimer, and acetic acid under an argon atmosphere, and heating to reflux to obtain a purple dinuclear rhodium complex detecting agent;

(4) The platinum/hollow mesoporous silica sphere and the dinuclear rhodium complex detecting agent are dispersed in ethanol containing silica gel to obtain a dinuclear rhodium complex-doped platinum/hollow mesoporous silica sphere composite material.

And the platinum/hollow mesoporous silica sphere composite in the above is placed in CO atmosphere, to complete the treatment of CO, or the dinuclear rhodium complex-doped platinum/hollow mesoporous silica sphere composite material is placed in CO atmosphere, to complete the detection and treatment of CO.

Preferably, in the step (1), the mass ratio of ethanol, water, ammonia water, tetraethyl orthosilicate is 580:100:31:52; first, the ethanol, water and ammonia water are mixed and stirred at room temperature for 30 minutes, then tetraethyl orthosilicate is added, stirred for 10 minutes, and then allowed to stand for 60 minutes; then tetraethyl silicate and octadecyltrimethoxysilane with mass ratio of 333:151 are added, and stand at room temperature for 3 hours.

The product is selectively etched at 80° C. for 2 hours with a sodium carbonate solution (0.6 mol/L). Then, the HMSs are separated from the mixture by centrifugation and washed with deionized water and ethanol. Afterward, the products are dried in oven at 80° C. and calcined at 550° C. for 6 h, with heating rate of 5° C./min.

The invention firstly adopts a simple selective etching and impregnation method to prepare a hollow mesoporous silica sphere, which has a large specific surface area, a uniform pore size, a controllable structure, and good repeatability. And the pores of HMSs can be as a good container for loading platinum nanoparticles, the large surface area can promote catalytic performance, so it is a good support material.

In the above technical scheme, in the step (2), the mass ratio of 3-aminopropyltriethoxysilane, ethanol and HMSs in the amination process is 10:(190-210):2, and the reaction temperature is 100° C.-130° C., preferably 100° C., the stirring time is 24 to 36 hours, preferably 24 hours. The powder is immersed in the chloroplatinic acid solution, stirred 5~10 h under vacuum, preferably 8 hours, the calcination is carried out at 200300° C. for 2~4 h with a heating rate of 2~5° C./min in hydrogen. The calcination condition is preferentially selected at 300° C. for 3 h with the heating rate of 2.5° C./min.

The invention adopts a simple method to prepare a platinum/hollow mesoporous silica sphere catalyst. In this invention hydrogen was used as a reducing agent. And in the catalyst, the platinum nanoparticles are extremely small and uniformly loaded into the carrier, and in addition, the catalyst has a good catalytic performance.

In the above technical scheme, in the step (3), the mass ratio of the triphenylphosphine, the rhodium acetate dimer, and the acetic acid is 1:1:100, the heating temperature is 120 to 150° C., preferably 120° C., and the reflux time is 30~60 minutes, preferably 45 minutes.

The invention adopts a simple method to prepare a dinuclear rhodium complex as the detection agent. The detection agent has good selectivity and sensitivity, and can detect 50 ppm of CO in air, in addition, the detection agent possesses a significant color change when exposure CO atmosphere.

In the above technical scheme, in the step (4), the mass ratio of the catalyst, the detecting agent, the ethanol, and the silica gel is 1:2:50:20.

The present invention discloses a system for processing CO which is integrated with detection and catalysis. The platinum/hollow mesoporous silica sphere composite material doped with the dinuclear rhodium complex is placed in CO atmosphere to complete the treatment of CO.

Advantages of the Present Invention

1. In the invention, the formed Pt nanoparticles are minimally and uniformly. And the HMSs have a large specific surface area, controllable structure, high porosity and good reproducibility. The dinuclear rhodium complex has good selectivity and sensitivity, and can detect CO of 50 ppm in air, which has good industrialization prospects.

2. In the invention, the dinuclear rhodium complex material can detect the CO when exposed in the CO atmosphere.

And the probe displays a remarkable color modulation from violet to orange at CO concentration levels >50 ppm. The color of the probe is also recovered with time when the CO is fully catalyzed.

3. In the invention, the preparation method of the dinuclear rhodium complex-doped platinum/hollow mesoporous silica sphere composite material is simple in operation, and has good detection and catalytic effect on CO, which is very favorable for industrial application.

DETAILED DESCRIPTION OF THE INVENTION

Embodiment 1

Preparation of Hollow Mesoporous Silica (HMSs), the Specific Steps are as Follows:

58.5 g of ethanol, 10 g of deionized water, and 3.1 g of ammonia solution are mixed and stirred for 30 min at room temperature. Then, 5.2 g of TEOs is added to the above mixture with vigorous stirring for 10 min and left stationary for 60 min. Then 3.33 g of TEOs and 1.51 g of $C_{18}TMOs$ are mixed and added into the above mixture and stirred for 1 min. The mixed solution is kept for 3 h without stirring at room temperature, separated by centrifugation to obtain $sSiO_2@mSiO_2$. The product is selectively etched at 80° C. for 2 h with a sodium carbonate solution having a concentration of 0.6 mol/L. After drying, it is calcined in air atmosphere with the heating rate of 5° C./min to 550° C. for 6 h to get HMSs.

Figure 1:
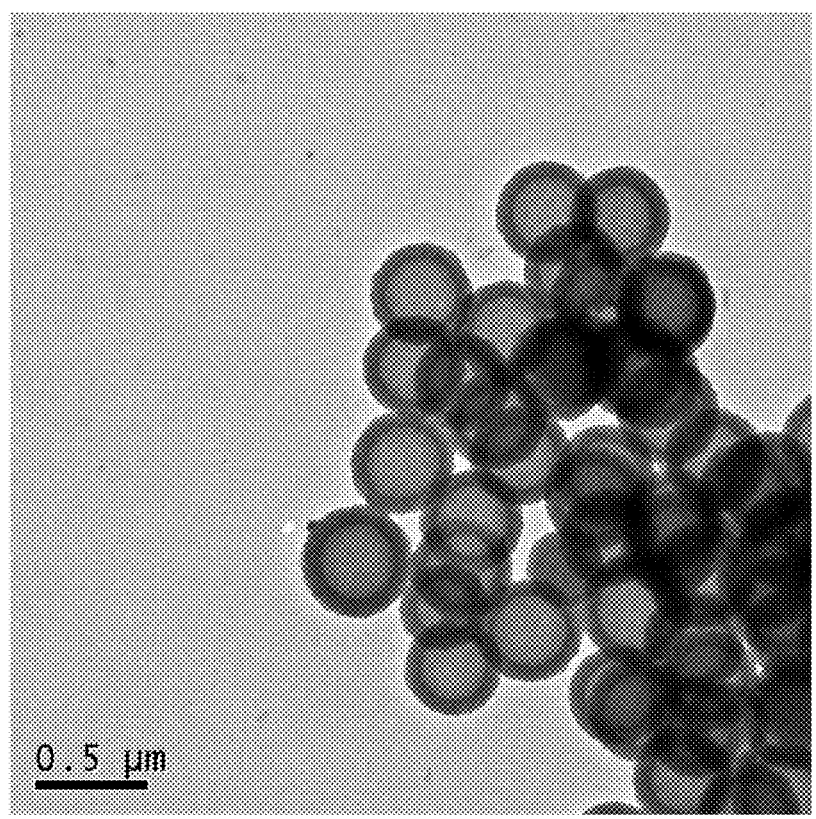
FIG. 1: TEM images of the HMSs.
Figure 2:
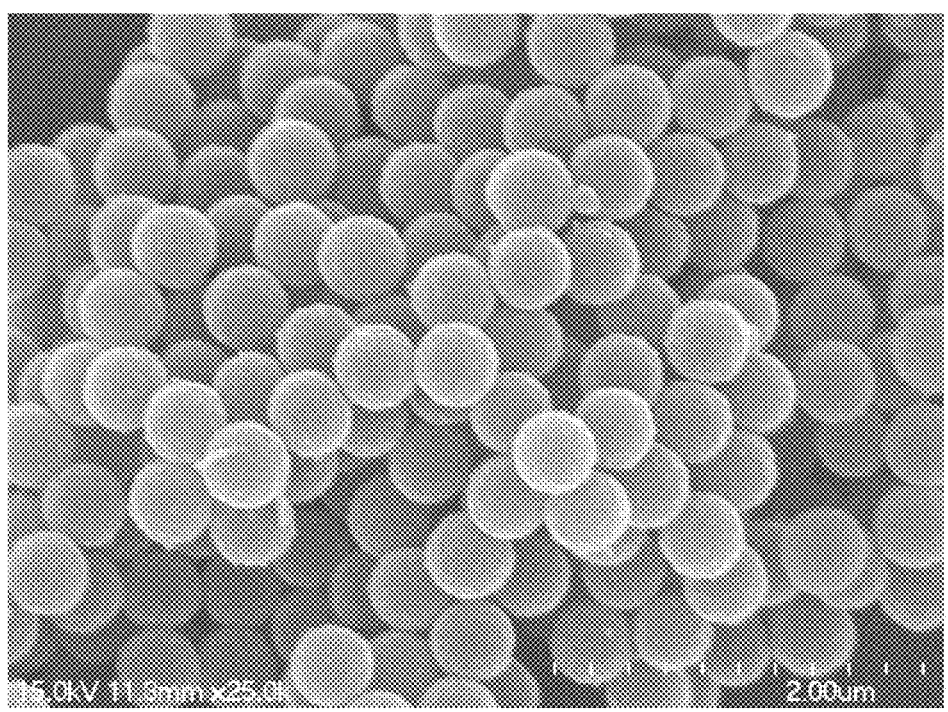
FIG. 2: SEM images of the HMSs.

FIG. 1 shows the TEM images of the HMSs. FIG. 2 shows the SEM images of the HMSs. The figures show the uniform hollow sphere structure, and the distribution is more uniform.

Embodiment 2

Preparation of Platinum/Hollow Mesoporous Silica Composites (Pt/HMSs), the Specific Steps are as Follows:

The HMSs are first subjected to surface amination modification, 2 g of HMSs are added to 200 ml of ethanol containing 10 g of 3-aminopropyltriethoxysilane, followed by heating under reflux for 24 hours, centrifugation, and washing with ethanol and water. The resulting aminated silica is then added to different concentrations of chloroplatinic acid in aqueous solutions at concentrations of 5 mmol/L, 10 mmol/L, and 20 mmol/L (corresponding to Pt/HMSs loadings of 1%, 3%, 5% platinum), then stirred under vacuum for 3 h, centrifuged, and calcined under a hydrogen atmosphere at a heating rate of 2.5° C./min for 3 h at a temperature of 300° C.

Figure 3:
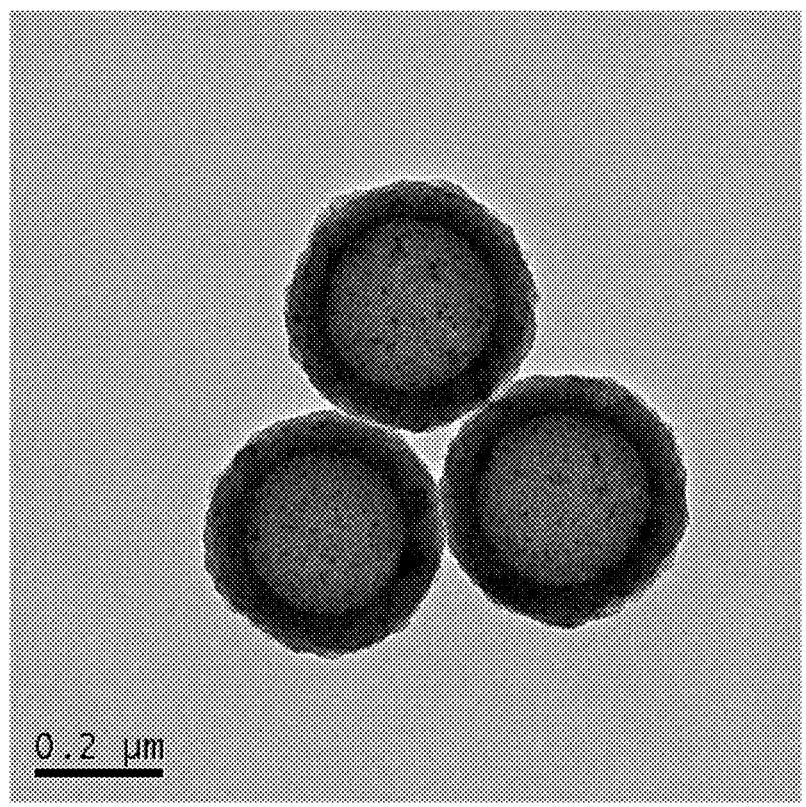
FIG. 3: TEM images of the Pt/HMSs.
Figure 4:
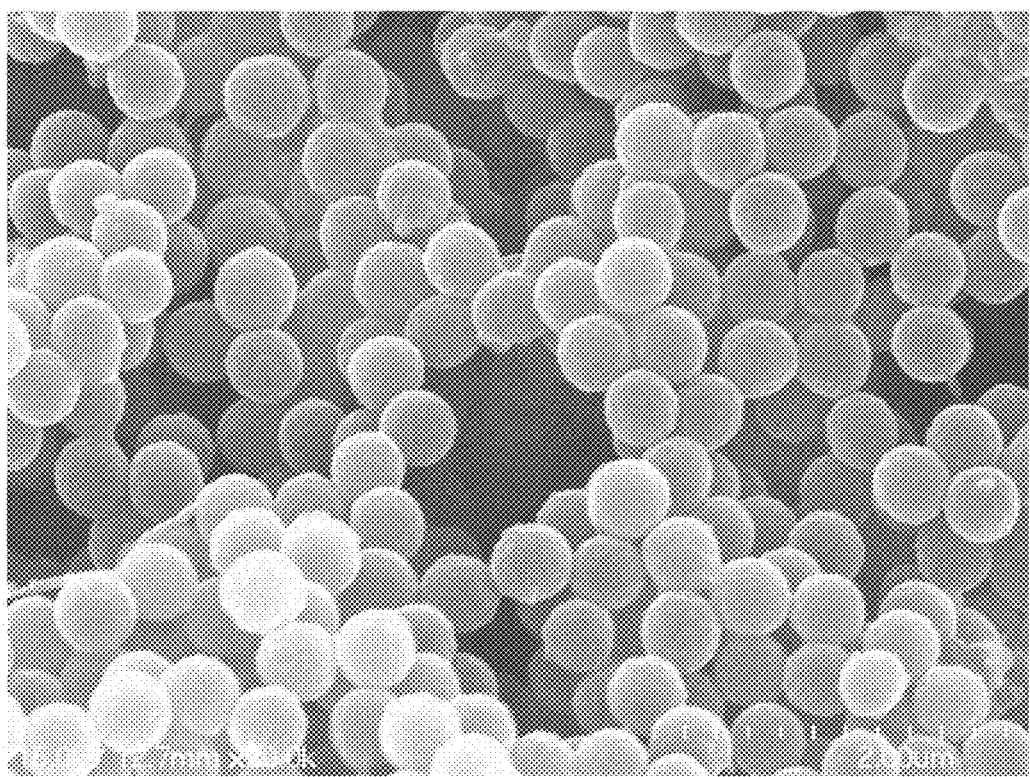
FIG. 4: SEM images of the Pt/HMSs.

FIG. 3 is a TEM image of Pt/HMSs, and FIG. 4 is an SEM image of Pt/HMSs. It can be seen from the TEM image that the platinum nanoparticles are successfully loaded into the pores of the HMSs and the distribution is relatively uniform. It can be seen from the SEM image that the silica sphere after loading did not change significantly, which was consistent with the morphology before loading.

Figure 5:
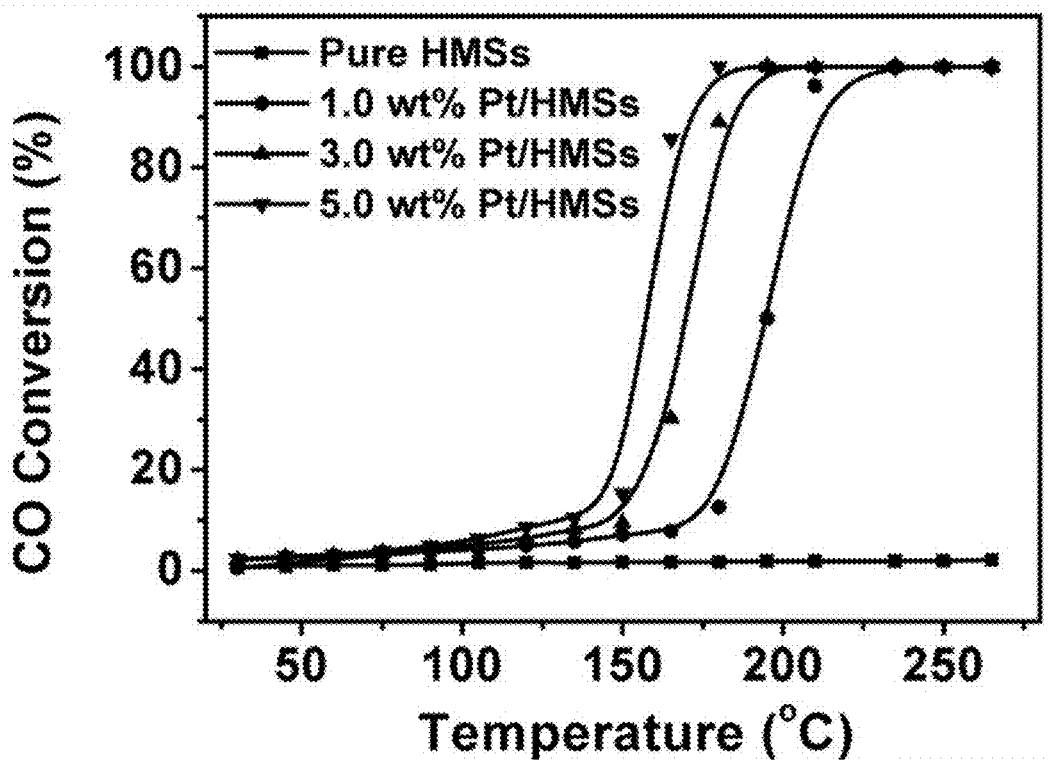
FIG. 5: CO conversion as a function of reaction temperature.
Figure 6:
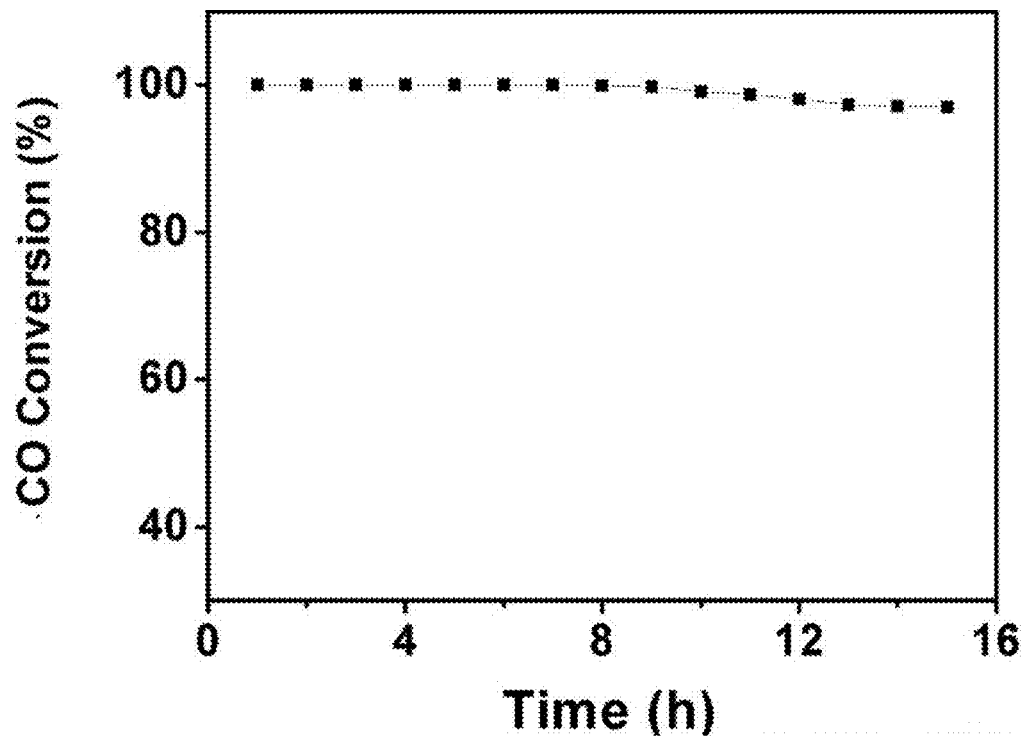
FIG. 6: Durability of Pt/HMSs for CO oxidation.

The prepared 50 mg of Pt/HMSs is placed in a 1% CO environment for catalytic CO oxidation. The specific CO conversion effect is analyzed by gas chromatography. That is, a standard curve is established by the standard gas, and the concentration of CO is recorded as 1, and then as the catalysis progresses, the concentration gradually decreases, thereby obtaining a specific CO conversion result. FIG. 5 is a graph showing the conversion of CO by Pt/HMSs, and FIG. 6 is a stability test of the catalyst. As can be seen from FIG. 5, the catalyst loaded with 5% platinum is optimal in the same time, and a catalytic effect of 100% can be achieved at 170° C. If the loading of platinum is too much, it will easily lead to metal agglomeration, which will lead to a decrease in catalytic effect. The effect of 6% platinum is worse than 5%. FIG. 6 shows the stability test of Pt/HMSs (loaded with 5% platinum). Within a few hours, its catalytic activity is not substantially reduced, which is beneficial to the practical application of the present invention. The atmospheric CO pollution mainly comes from the emission of automobile exhaust gas, and the calculation method of CO conversion rate is as follows:

$$\eta = \frac{C_0 - C}{C_0} \times 100\% \quad (1)$$

$C_0$ and $C$ are the initial and test concentrations of CO in the experiment (tested every 30 minutes).

Embodiment 3

Preparation of a Dinuclear Rhodium Complex:

0.15 g of triphenylphosphine and 0.15 g of rhodium acetate dimer are added to 10 to 20 ml of acetic acid at a heating temperature of 120 to 150° C. for a reflux time of 45 minutes, and then a purple product dinuclear rhodium complex is obtained.

Embodiment 4

Figure 7:
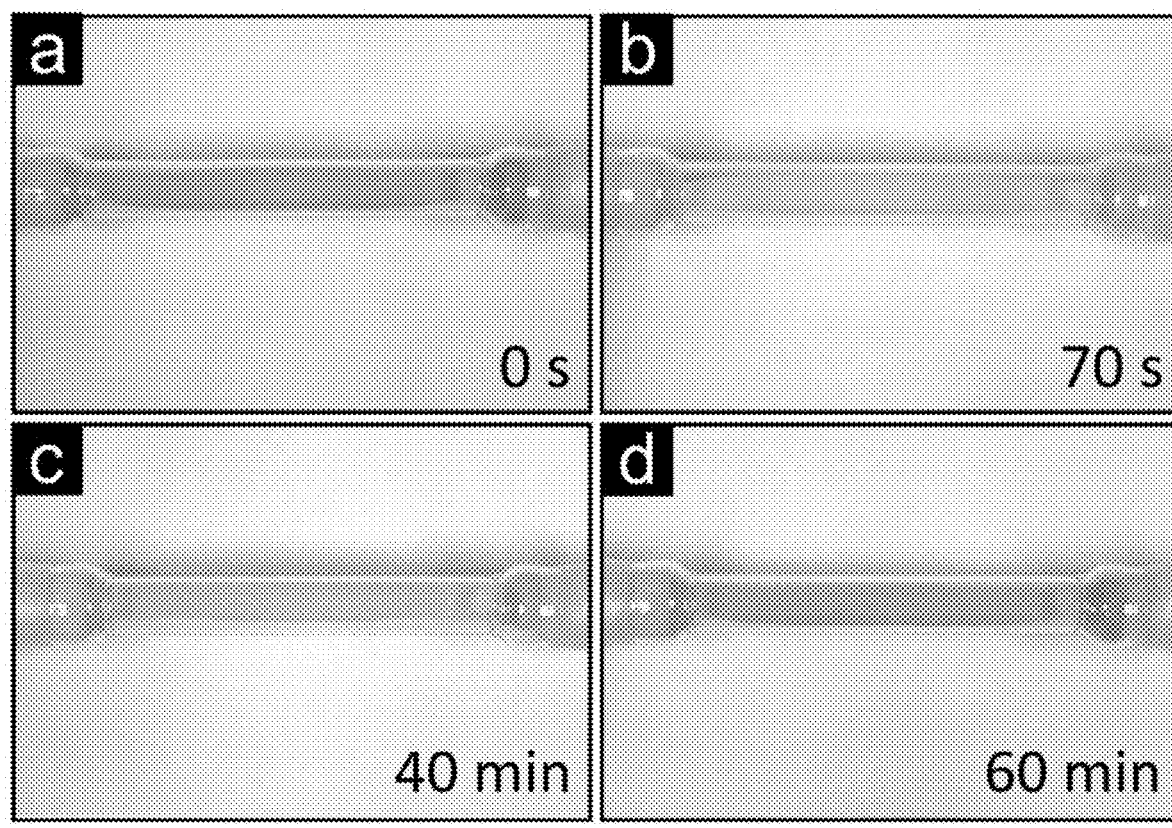
FIG. 7: Photograph showing the color modulation of Pt/HMSs-BRC in contact with an air atmosphere containing 50 ppm of CO.

Preparation of Dinuclear Rhodium Complex-Doped Platinum/Hollow Mesoporous Silica Sphere Composite Material, Detection and Catalytic Oxidation of CO:

100 mg of Pt/HMSs and 200 mg of the detector dinuclear rhodium complex are separately dispersed in 5 ml of ethanol, and adsorbed in 2 g of silica gel to prepare a dinuclear rhodium complex-doped platinum/hollow mesoporous silica sphere composite material. Due to the porosity of silica gel, the detection agent and the catalyst can have a better adsorption effect, facilitate the thorough mixing of the two, and demonstrate good synergy. The obtained composite material is placed in a 50 ppm CO environment, and its color change is observed. The specific process is shown in FIG. 7, in which (a) shows the color after mixing. It can be seen as purple from the figure. With the introduction of CO gas, it can be seen that the color turns orange after 70 s, indicating that the detector is combined with CO. As the temperature increases, the catalyst began to be activated, and the color turned pale yellow at 40 minutes, and as the catalyst is continuously catalyzed, the color completely returned to purple after 60 minutes.

In the CO catalyst disclosed by the invention, hollow mesoporous silica is selected as a carrier, and the noble metal platinum is uniformly loaded into the pores thereof, and the platinum nanoparticles have high catalytic activity, especially after loading the hollow mesoporous silica, the catalytic activity is greatly improved; the silica material has the advantages of high specific surface area, good stability, controllable structure, high porosity, etc.; as the dinuclear rhodium complex of the invention is highly selective and sensitive to CO, it has a good advantage in the detection of CO. The invention combines the detection material with the catalyst to make it more widely used in the treatment of CO waste gas.

What we claim is:

1. A preparation method of a dinuclear rhodium complex-doped platinum/hollow mesoporous silica sphere composite material, consisting of:
   (1) mixing ethanol, water, ammonia water and tetraethyl orthosilicate to obtain silica nanospheres; then adding an additional tetraethyl orthosilicate and octadecyltrimethoxysilane to obtain core-shell structure silica spheres;
   (2) adding the core-shell structure silica spheres to a sodium carbonate solution for reaction, and then calcining to obtain hollow mesoporous silica spheres;
   (3) after surface amination, immersing the hollow mesoporous silica spheres in a solution containing chloroplatinic acid, stirring and centrifuging, and then reducing to obtain platinum/hollow mesoporous silica spheres;
   (4) mixing triphenylphosphine, rhodium acetate dimer, and acetic acid under an argon atmosphere to obtain a dinuclear rhodium complex;
   (5) dispersing the platinum/hollow mesoporous silica spheres and the dinuclear rhodium complex in ethanol containing silica gel to obtain the dinuclear rhodium complex-doped platinum/hollow mesoporous silica sphere composite material,
   wherein:
   in the step (1), the mass ratio of the ethanol, the water, the ammonia water, the tetraethyl orthosilicate is (580~590):(90~110):(0~32):(50~55), first, the ethanol, the water and the ammonia water are mixed and stirred at room temperature for 20 to 30 minutes, then the tetraethyl orthosilicate is added, stirred for 5 to 10 minutes, and then allowed to stand for 60 to 90 minutes to obtain the silica nanospheres; then the additional tetraethyl orthosilicate and the octadecyltrimethoxysilane are added, and stand at room temperature for 2 to 4 hours to obtain the core-shell silica spheres;
   in the step (2), the concentration of the sodium carbonate solution is 0.5 to 0.7 mol/L; the reaction temperature is 70 to 90° C., the reacting time is 1 to 2 hours; during the calcination, the heating rate is 2 to 10° C./min, the heating time is 5 to 10 h, and the heating temperature is 500 to 600° C.;
   in the step (3), a reagent for the surface amination is 3-aminopropyltriethoxysilane, a solvent for the surface amination is ethanol; and the surface amination temperature is 100° C.~130° C., reaction time for the surface amination is 24~36 hours; the mass ratio of the 3-aminopropyl triethoxysilane, the ethanol and the hollow mesoporous silica spheres is (10~20):(190~210):(2~5); the stirring is carried out under vacuum for 5 to 10 hours; in the reducing process, the heating rate is 2 to 5° C./min, the heating time is 2 to 4 hours, the temperature is 200 to 300° C.; in the solution containing the chloroplatinic acid, a solvent in the solution is water, a concentration of the chloroplatinic acid in the solution is 20 mmol/L; when reducing, an agent for the reducing is hydrogen;
   in the step (4), the mass ratio of the triphenylphosphine, the rhodium acetate dimer, and the acetic acid is (1~2):(1~2):(100~150), a temperature for the mixing is 120° C.~150° C., a time for the mixing is 30 to 60 minutes; and
   in the step (5), the mass ratio of the platinum/hollow mesoporous silica spheres, the dinuclear rhodium complex, the ethanol and the silica gel is (1~2):(2~5):(50~60):(20~40).

2. A method of detection and/or treating CO, consisting of:
   (1) mixing ethanol, water, ammonia water and tetraethyl orthosilicate to obtain silica nanospheres; then adding an additional tetraethyl orthosilicate and octadecyltrimethoxysilane to obtain core-shell structure silica spheres;
   (2) adding the core-shell structure silica spheres to a sodium carbonate solution for reaction, and then calcining to obtain hollow mesoporous silica spheres;
   (3) after surface amination, immersing the hollow mesoporous silica spheres in a solution containing chloroplatinic acid, stirring and centrifuging, and then reducing to obtain platinum/hollow mesoporous silica spheres;
   (4) mixing triphenylphosphine, rhodium acetate dimer, and acetic acid under an argon atmosphere to obtain a dinuclear rhodium complex;
   (5) dispersing the platinum/hollow mesoporous silica spheres and the dinuclear rhodium complex in ethanol containing silica gel to obtain a dinuclear rhodium complex-doped platinum/hollow mesoporous silica sphere composite material;
   (6) placing the platinum/hollow mesoporous silica spheres in an environment containing CO to complete detection and/or treatment of CO or placing the dinuclear rhodium complex-doped platinum/hollow mesoporous silica sphere composite material in an environment containing CO to complete detection and/or treatment of CO,
   wherein:
   in the step (1), the mass ratio of the ethanol, the water, the ammonia water, the tetraethyl orthosilicate is (580~590):(90~110):(0~32):(50~55), first, the ethanol, the water and the ammonia water are mixed and stirred at room temperature for 20 to 30 minutes, then the tetraethyl orthosilicate is added, stirred for 5 to 10 minutes, and then allowed to stand for 60 to 90 minutes to obtain the silica nanospheres; then the additional tetraethyl othrosilicate and the octadecyltrimethoxysilane are added, and stand at room temperature for 2 to 4 hours to obtain the core-shell silica spheres;
   in the step (2), the concentration of the sodium carbonate solution is 0.5 to 0.7 mol/L; the reaction temperature is 70 to 90° C., the reacting time is 1 to 2 hours; during the calcination, the heating rate is 2 to 10° C./min, the heating time is 5 to 10 h, and the heating temperature is 500 to 600° C.;
   in the step (3), a reagent for the surface amination is 3-aminopropyltriethoxysilane, a solvent for the surface amination is ethanol; and the surface amination temperature is 100° C.~130° C., reaction time for the surface amination is 24~36 hours; the mass ratio of the 3-aminopropyl triethoxysilane, the ethanol and the hollow mesoporous silica spheres is (10~20):(190~210):(2~5); the stirring is carried out under vacuum for 5 to 10 hours; in the reducing process, the heating rate is 2 to 5° C./min, the heating time is 2 to 4 hours, the temperature is 200 to 300° C.; in the solution containing the chloroplatinic acid, a solvent in the solution is water, a concentration of the chloroplatinic acid in the solution is 20 mmol/L; when reducing, an agent for the reducing is hydrogen;

in the step (4), the mass ratio of the triphenylphosphine, the rhodium acetate dimer, and the acetic acid is (1~2):(1~2):(100~150), a temperature for the mixing is 120° C.~150° C., a time for the mixing is 30 to 60 minutes; and in the step (5), the mass ratio of the platinum/hollow mesoporous silica spheres, the dinuclear rhodium complex, the ethanol and the silica gel is (1~2):(2~5):(50~60):(20~40).

* * * * *